United States Patent Office 3,086,847
Patented Apr. 23, 1963

3,086,847
BORON PRODUCTION
Stuart Schott and Virgil L. Hansley, Cincinnati, Ohio, assignors to National Distillers and Chemical Corporation, New York, N.Y., a corporation of Virginia
No Drawing. Filed Dec. 17, 1958, Ser. No. 780,938
4 Claims. (Cl. 23—209)

This invention relates to an improved method for the manufacture of elemental boron.

One object of the invention is the production of elemental boron in an improved, efficient method. Another object is to provide a practical and commercial method for the production of pure boron. A further object is to provide a process for the production of crystalline boron in a continuous manner from boron trihalides and an alkali metal.

In the past, it has been known to reduce boron halides with an alkali metal as the reducing agent to give elemental boron and alkali metal halide as the by-product. The reaction has been carried out for instance by contacting a gaseous boron halide with alkali metal, in the form of a molten spray or pool or in the form of vapor. These processes are extremely inefficient and uneconomical in that, for instance, in the case of the molten spray, the entire reaction takes place at the surface of the droplets which reaction is incomplete because of coating of the alkali metal reactant with reaction products as they are formed. In the case of reaction of the boron halide and alkali metal in vapor form, the products are formed as a fine mist which are extremely difficult to collect and recover. In addition the boron product from the vapor phase reaction is extremely unstable in the presence of air and ignites spontaneously.

It has been found that the reduction of boron halides with alkali metal may be carried out in a "dry-way" reaction at reasonable temperature levels in the reactor by reducing for instance, boron trihalide with alkali metal dispersed on a finely divided solids bed of reaction products, i.e., boron and alkali metal halide.

The reaction may be started with a bed of, e.g., solid sodium chloride. To this agitated bed but not necessarily maintained at a temperature above the melting point of the alkali metal is added alkali metal and boron trichloride at a rate such that the temperature of the bed stays preferably at least 50° C. below the melting point of the by-product sodium halide. Alternately or simultaneously the two reactants may be fed continuously to the agitated bed and the product powder continuously or semi-continuously withdrawn therefrom. It was found that the product of this reaction is a free-flowing finely-divided powder easily handled in solids handling equipment such as standard screw conveyors and the like. To isolate the elemental boron in a high purity form it is then necessary to heat the mixture of reaction products above the melting point of the sodium halide by-product. After cooling, the by-product sodium halide is dissolved in water and the insoluble, elemental boron separated in some convenient manner as by filtration or centrifuging.

Example

The apparatus used was a round bottom glass flask equipped with anchor type agitator, motor drive for agitation, heating mantle, thermometer, inlet ports for sodium and BCl₃ and argon gas. Agitation was started and two hundred grams of sodium chloride were added to the flask. The flask was purged of air by passing argon gas in and testing exit gas until it showed only a trace of oxygen. The heating mantle was turned on until the salt had reached a temperature of about 150° C. at which point about 5 grams of sodium were added from a reservoir of molten sodium suitably attached to the flask. The sodium immediately dispersed over the salt in the form of a very thin film. Boron trichloride was then added as a gas until about 7 grams had been added and at a rate so as to maintain bed temperature of about 375° C. In a similar manner the addition of sodium and boron trichloride was continued until 200 grams of sodium and 340 grams of boron trichloride had been added over a time interval of about 1½ hours. Total weight of the reaction mixture was 740 grams. 300 grams of this mixture was transferred to a stainless steel sintering tube under an argon atmosphere and the tube and contents heated in an electric furnace to 925° C. and held at this temperature for 2½ hours. The tube and contents were allowed to cool under an argon atmosphere. The fused salt and elemental boron mixture was broken up and removed from the tube. This black, crystalline product was crushed and then leached with water until the sodium chloride was completely removed. The black powder remaining undissolved was filtered and then dried at 60° C. in vacuum. Product recovered weighed 13.7 grams analyzing 94.8% boron.

While there are above disclosed but a limited number of embodiments of the invention herein presented, it is possible to produce still other embodiments without departing from the inventive concept herein disclosed, and it is desired therefore that only such limitations be imposed on the appended claims as are stated therein.

What is claimed is:

1. Process for the manufacture of elemental boron which comprises reacting boron trichloride with a stoichiometrically equivalent amount of sodium dispersed on a finely divided solids bed of reaction products comprising essentially elemental boron and sodium chloride, a stoichiometric condition being maintained throughout the reaction and the temperature of said reaction being maintained at least 50 centigrade degrees below the melting point of the by-product sodium chloride, recovering elemental boron therefrom.

2. Process for the manufacture of pure elemental boron which comprises reacting boron trichloride with a stoichiometrically equivalent amount of sodium in a dry, finely divided bed of reaction products including the by-product sodium chloride, a stoichiometric condition being maintained throughout the reaction, heating the reduced product at temperatures above the melting point of sodium chloride by-product, leaching the boron produced, and recovering pure, elemental boron therefrom.

3. Process for the continuous production of elemental boron which comprises continuously reacting boron trichloride with a stoichiometrically equivalent amount of sodium, said sodium being dispersed on a finely divided solids bed of a mixture of reaction products comprising boron and sodium chloride, a stoichiometric condition being maintained throughout the reaction and the temperature of said reaction being maintained at least 50 centigrade degrees below the melting point of sodium chloride and recovering elemental boron therefrom.

4. Process for production of pure elemental boron which comprises reacting boron trichloride with a stoichiometrically equivalent amount of sodium in a dry, finely divided bed of reduced reaction products including the by-product sodium chloride, a stoichiometric condition being maintained throughout the reaction, heating at least a part of the reduced mixture at a temperature above the melting point of the sodium chloride, leaching the boron so produced, and recovering pure elemental boron therefrom.

References Cited in the file of this patent
UNITED STATES PATENTS

| | | |
|---|---|---|
| 2,685,501 | Spevack | Aug. 3, 1954 |
| 2,827,371 | Quin | Mar. 18, 1958 |
| 2,910,357 | Muller | Oct. 27, 1959 |
| 2,956,862 | Schott et al. | Oct. 18, 1960 |

OTHER REFERENCES

Mellor: Comprehensive Treatise on Inorganic and Theoretical Chemistry, Longmans, Green & Co., New York, 1924, vol. 5, pages 8, 123, and 133.